US012606196B2

(12) United States Patent
Okunishi

(10) Patent No.: US 12,606,196 B2
(45) Date of Patent: Apr. 21, 2026

(54) CONTROL DEVICE FOR AUTOMATED DRIVING OF VEHICLE

(71) Applicant: Honda Motor Co., Ltd., Tokyo (JP)

(72) Inventor: Shinichi Okunishi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 18/179,369

(22) Filed: Mar. 7, 2023

(65) Prior Publication Data

US 2024/0300519 A1 Sep. 12, 2024

(51) Int. Cl.
*B60W 60/00* (2020.01)
*G06T 7/00* (2017.01)

(52) U.S. Cl.
CPC ......... *B60W 60/001* (2020.02); *G06T 7/0002* (2013.01); *B60W 2420/403* (2013.01); *B60W 2420/408* (2024.01); *B60W 2552/10* (2020.02); *B60W 2554/4041* (2020.02); *B60W 2554/4044* (2020.02); *G06T 2207/30168* (2013.01); *G06T 2207/30252* (2013.01)

(58) Field of Classification Search
CPC ............ G06V 20/58; B60W 30/18159; B60W 2554/4048; B60W 2420/408; B60W 30/18036; B62D 6/002; G05D 1/0088; G05D 1/0212
See application file for complete search history.

(56) References Cited

U.S. PATENT DOCUMENTS

| | | | | |
|---|---|---|---|---|
| 7,422,337 | B1 * | 9/2008 | Fetherston | .............. B60R 1/006 |
| 10,331,135 | B2 * | 6/2019 | Gao | ..................... G05D 1/0088 |
| 10,488,861 | B2 * | 11/2019 | Allan | .............. B60W 60/00276 |
| 2020/0156694 | A1 * | 5/2020 | Moshchuk | ............ B60W 10/20 |

FOREIGN PATENT DOCUMENTS

| | | |
|---|---|---|
| JP | 2016210386 | 12/2016 |
| JP | 2022165446 | 11/2022 |

* cited by examiner

*Primary Examiner* — Christian Chace
(74) *Attorney, Agent, or Firm* — JCIPRNET

(57) ABSTRACT

A control device for a vehicle including a first sensor and a second sensor. The control device includes a processor configured to function as: a data receiving part, receiving sensor data from the first sensor; an occlusion detection part, detecting a presence of an occlusion around the vehicle based on the sensor data received; a target trajectory generating part, generating the predetermined target trajectory of the vehicle for automated driving of the vehicle, the predetermined target trajectory is set such that the vehicle is configured to enter a roadway from an outside of the roadway via a rear direction of the vehicle; wherein in a case when the occlusion detection part detects the presence of the occlusion, the predetermined target trajectory is generated such that, when the vehicle enters the roadway, the rear direction of the vehicle relative to the roadway is set such that the occlusion is reduced.

9 Claims, 9 Drawing Sheets

Second Camera System
Sensing Range X1

First Camera System
Sensing Range R1

Second Sonar System
Sensing Range X2

First Sonar System
Sensing Range R2

| LANE TO MERGE INTO | ONCOMING TRAFFIC DIRECTION | POSITION OF PARKED CAR | DIRECTION TO CHECK | PRESENCE OF OCCLUSION | DIRECTION TO ROTATE CAR | VISUAL REPRESENTATION |
|---|---|---|---|---|---|---|
| 1ST Lane Heading Left | Coming from Right Side | Right Side | Right Side | YES | Counter-clockwise | |
| 1ST Lane Heading Left | Coming from Right Side | Left Side | Right Side | NO | Straight | |
| 1ST Lane Heading Left | Coming from Right Side | Both Sides | Right Side | YES | Counter-clockwise | |
| 1ST Lane Heading Right | Coming from Left Side | Right Side | Left Side | NO | Straight | |
| 1ST Lane Heading Right | Coming from Left Side | Left Side | Left Side | YES | Clockwise | |
| 1ST Lane Heading Right | Coming from Left Side | Both Sides | Left Side | YES | Clockwise | |

FIG. 9

| LANE TO MERGE INTO | ONCOMING TRAFFIC DIRECTION | POSITION OF PARKED CAR | DIRECTION TO CHECK | PRESENCE OF OCCLUSION | DIRECTION TO ROTATE CAR | VISUAL REPRESENTATION |
|---|---|---|---|---|---|---|
| 2nd Lane Heading Left | Coming from Right Side | Right Side | Right Side | YES | Counter-clockwise | |
| 2nd Lane Heading Left | Coming from Right Side | Left Side | Right Side | NO | Straight | |
| 2nd Lane Heading Left | Coming from Right Side | Both Sides | Right Side | YES | Counter-clockwise | |
| 2nd Lane Heading Left | Coming from Left Side | Right Side | Left Side | NO | Straight | |
| 2nd Lane Heading Left | Coming from Left Side | Left Side | Left Side | YES | Clockwise | |
| 2nd Lane Heading Left | Coming from Left Side | Both Sides | Left Side | YES | Clockwise | |

FIG. 10

| LANE TO MERGE INTO | ONCOMING TRAFFIC DIRECTION | POSITION OF PARKED CAR | DIRECTION TO CHECK | PRESENCE OF OCCLUSION | DIRECTION TO ROTATE CAR | VISUAL REPRESENTATION |
|---|---|---|---|---|---|---|
| 2nd Lane Heading Right | Coming from Right Side | Right Side | Right Side | YES | Counter-clockwise | |
| 2nd Lane Heading Right | Coming from Right Side | Left Side | Right Side | NO | Straight | |
| 2nd Lane Heading Right | Coming from Right Side | Both Sides | Right Side | YES | Counter-clockwise | |
| 2nd Lane Heading Right | Coming from Left Side | Right Side | Left Side | NO | Straight | |
| 2nd Lane Heading Right | Coming from Left Side | Left Side | Left Side | YES | Clockwise | |
| 2nd Lane Heading Right | Coming from Left Side | Both Sides | Left Side | YES | Clockwise | |

FIG. 11

CONTROL DEVICE FOR AUTOMATED DRIVING OF VEHICLE

BACKGROUND

Technical Field

The disclosure relates to a control device of a vehicle, and more specifically relates to the control device for automated driving of the vehicle.

Description of Related Art

Conventionally, a plurality of sensors are disposed on a vehicle to support and/or control automated driving of the vehicle. When some sensors have an occlusion, the sensors which may be used to detect objects around the vehicle become limited, and/or a performance such as a detection distance of those sensors may decrease.

If an overall performance of the sensors is to be increased and/or upgraded, for example, by improved hardware or increasing the number of sensors, then the associated cost of the hardware may also increase. Therefore, a way to improve the performance of a sensor even when an occlusion is detected is needed.

SUMMARY

According to an embodiment of the disclosure, a control device adapted to generate a predetermined target trajectory of a vehicle for automated driving of a vehicle is provided, wherein the vehicle includes a first sensor and a second sensor adapted to detect an object around the vehicle, and a first detection area of the first sensor is different from a second detection area of the second sensor. The control device includes a processor configured to function as: a data receiving part, receiving sensor data from the first sensor; an occlusion detection part, detecting a presence of an occlusion around the vehicle based on the sensor data received; a target trajectory generating part, generating the predetermined target trajectory of the vehicle for automated driving of the vehicle, the predetermined target trajectory is set such that the vehicle is configured to enter a roadway from an outside of the roadway via a rear direction of the vehicle; wherein in a case when the occlusion detection part detects the presence of the occlusion, the predetermined target trajectory is generated such that, when the vehicle enters the roadway, the rear direction of the vehicle relative to the roadway is set such that the occlusion is reduced.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

FIG. 9 is a schematic diagram illustrating a pattern table when the vehicle merges into a first lane according to an embodiment of the disclosure.

FIG. 10 is a schematic diagram illustrating a pattern table when the vehicle merges into a second lane having a travelling direction toward the left according to an embodiment of the disclosure.

FIG. 11 is a schematic diagram illustrating a pattern table when the vehicle merges into a second lane having a travelling direction toward the right according to an embodiment of the disclosure.

DESCRIPTION OF THE EMBODIMENTS

Figure 1:
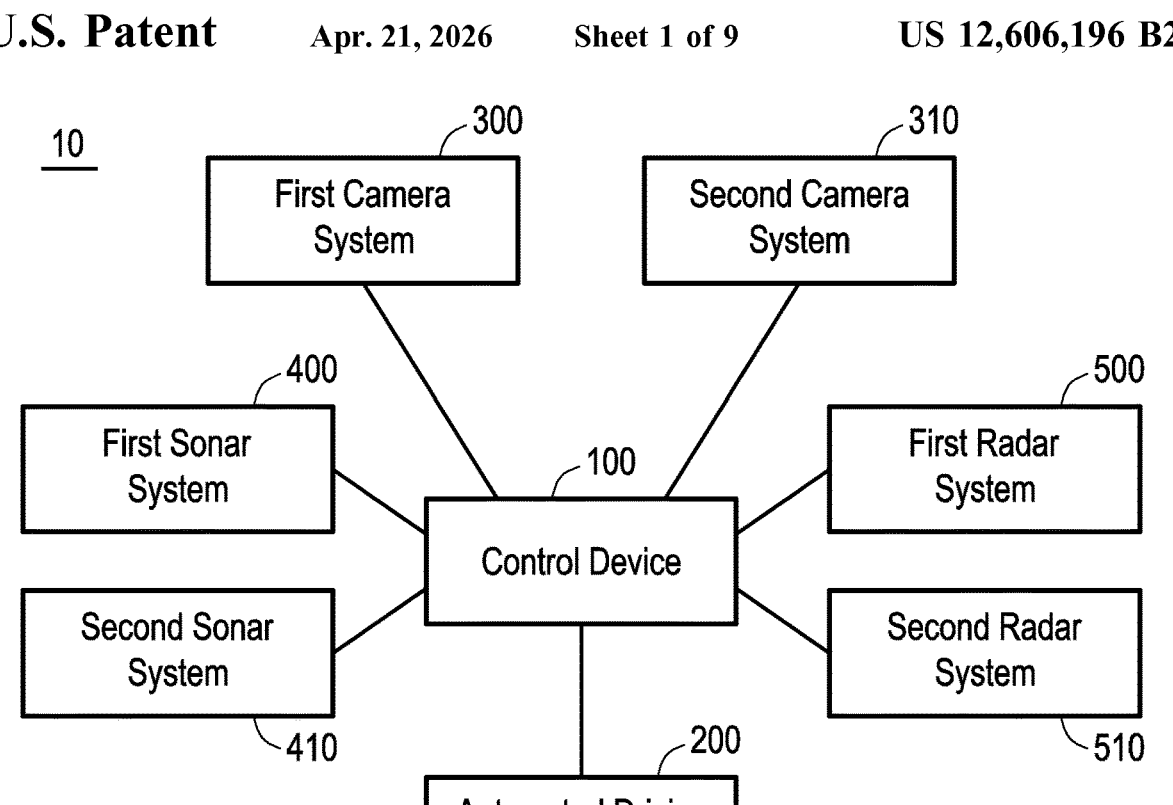
FIG. 1 is a schematic diagram illustrating a control device according to an embodiment of the disclosure.

FIG. 1 is a schematic diagram illustrating a control device according to an embodiment of the disclosure. Referring to FIG. 1, a vehicle 10 is provided. The vehicle 10 includes a control device 100 adapted to generate a predetermined target trajectory of a vehicle 10 for automated driving of the vehicle 10. The control device 100 includes a processor and a memory. The vehicle 10 includes an automated driving system 200 for automated driving of the vehicle 10. The automated driving system 200 is coupled to the control device 100, wherein the control device 100 transmits control signals to the automated driving system 200 so that the automated driving system 200 may perform automated driving of the vehicle 10. In more detail, the automated driving system 200 may include, for example, motors, sensors, actuators, processors and/or the like for performing automatic driving, automatic steering and automatic braking of the vehicle 10 without a user manually stepping on a gas pedal, steering and braking the vehicle 10. In addition, the vehicle 10 may be driven manually by the user instead of by the automated driving system 200, or semi-automatedly by the user and the automated driving system 200 together.

Referring to FIG. 1, the vehicle 10 includes a plurality of sensors. More specifically, the vehicle 10 includes a first camera system 300, a second camera system 310, a first sonar system 400, a second sonar system 410, a first radar system 500, a second radar system 510 for detecting an object around the vehicle 10. A number of the plurality of sensors is not intended to limit the disclosure and may be set according to requirements. An object(s) on a left side, a right side, a front side, a rear side of the vehicle 10 may be detected based on a configuration of the first camera system 300, the second camera system 310, the first sonar system 400, the second sonar system 410, the first radar system 500 and the second radar system 510. The control device 100 includes a data receiving part, receiving sensor data from the first camera system 300, the second camera system 310, the first sonar system 400, the second sonar system 410, the first radar system 500 and the second radar system 510.

The first camera system 300 and the second camera system 310 may each include, for example, a camera and/or an image sensor. The first camera system 300 and the second camera system 310 may detect an object in a line of sight (field of view) of the first camera system 300 and the second camera system 310. In addition, the first camera system 300 and the second camera system 310 may detect if an object is located in a viewing area of the first camera system 300 and the second camera system 310. The first camera system 300 and the second camera system 310 are an example of a first sensor and a third sensor, respectively. A number of the camera systems is not intended to limit the disclosure and may be set according to requirements. The first camera system 300 may be disposed, for example, at a right side mirror of the vehicle 10. The second camera system 310 may be disposed, for example at a left side mirror of the vehicle 10.

The first sonar system 400 and the second sonar system 410 may each include, for example, a sonar and/or a sonar microphone. The first sonar system 400 and the second sonar system 410 may detect, for example, a distance to an object and detect a signal level of a reflected wave from the object. The first sonar system 400 and the second sonar system 410 are an example of a second sensor and a fourth sensor, respectively. A number of the sonar systems is not intended to limit the disclosure and may be set according to requirements.

The first radar system 500 and the second radar system 510 may each include, for example, an array radar, an antenna and/or a phased array antenna. The first radar system 500 and the second radar system 510 may detect, for example, a distance to the object and detect a height of the object from a road surface. The first radar system 500 and the second radar system 510 are an example of a second sensor and a fourth sensor, respectively. A number of the radar systems is not intended to limit the disclosure and may be set according to requirements.

Figure 2:
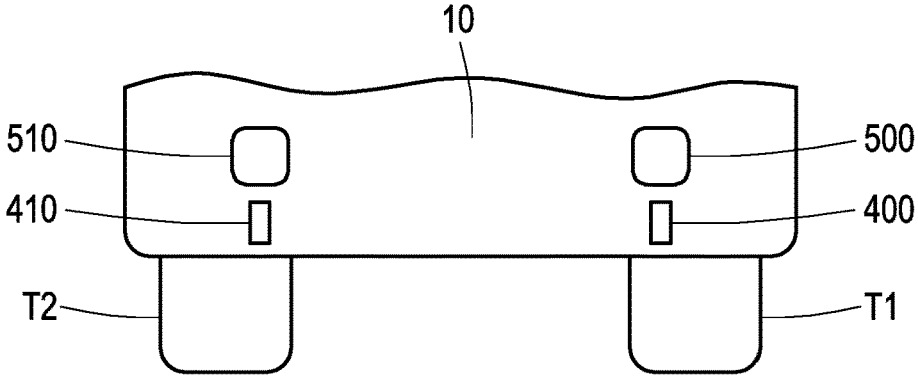
FIG. 2 is a schematic diagram illustrating a rear view of a vehicle according to an embodiment of the disclosure.

FIG. 2 is a schematic diagram illustrating a rear view of a vehicle according to an embodiment of the disclosure. Referring to FIG. 2, the vehicle 10 may include a first tire T1 and a second tire T2. A number of the tires is not intended to limit the disclosure and may be set according to requirements. The first sonar system 400, the second sonar system 410, the first radar system 500 and the second radar system 510 are disposed on a rear of the vehicle 10. More specifically, the first sonar system 400, the second sonar system 410, the first radar system 500 and the second radar system 510 are disposed at a rear bumper of the vehicle 10 to detect an object that is at the rear of the vehicle 10. However, the disclosure is not limited thereto. In another embodiment of the disclosure, for example, the first sonar system 400, the second sonar system 410, the first radar system 500 and the second radar system 510 may be disposed at a front of the vehicle 10 and/or a side of the vehicle 10. More specifically, the first sonar system 400, the second sonar system 410, the first radar system 500 and the second radar system 510 may be disposed at a front bumper or a side of the vehicle 10 to detect the object that is at the front or the side of the vehicle 10. The plurality of sensors may be disposed at locations of the vehicle 10 according to requirements.

Figure 3:
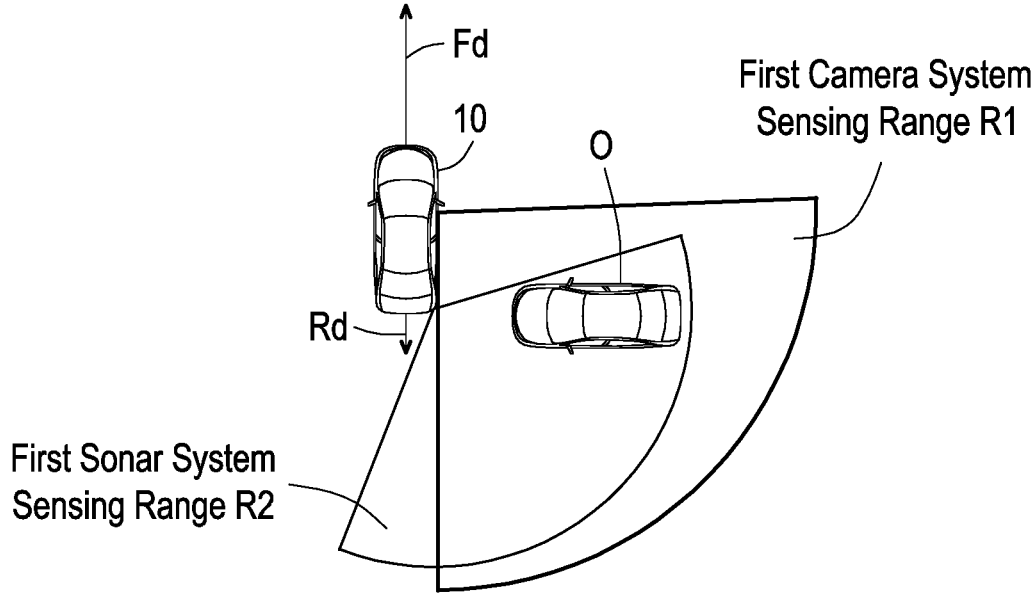
FIG. 3 is a schematic diagram illustrating a vehicle including a first sensor and a second sensor for detecting an object around the vehicle according to an embodiment of the disclosure.

FIG. 3 is a schematic diagram illustrating a vehicle including a first sensor and a second sensor for detecting an object around the vehicle according to an embodiment of the disclosure. Referring to FIG. 3, the first camera system 300 is disposed at the ride side mirror of the vehicle 10, and has a first camera system sensing range R1. The first camera system sensing range R1 is an example of a first detection area of the first sensor. In addition, the first sonar system 400 is disposed at the rear of the vehicle 10, and has a first sonar system sensing range R2. The first sonar system sensing range R2 is an example of a second detection area of the second sensor. The first camera system sensing range R1 of the first camera system 300 is different from the first sonar system sensing range R2 of the first sonar system 400. The first camera system 300 and/or the first sonar system 400 may detect an object O. In the present embodiment, the object O is another vehicle. However, the disclosure is not limited thereto. In another embodiment of the disclosure, the object O may be, for example, a wall, a power pole, and/or the like.

Referring to FIG. 3, the first camera system sensing range R1 and the first sonar system sensing range R2 are illustrated as examples only and the disclosure is not limited thereto. As shown in FIG. 3, the first detection area R1 of the first sensor 300 is different from the second detection area R2 of the second sensor 400. Furthermore, in the embodiment of FIG. 3, the second sensor 400 is implemented using the first sonar system 400, however in another embodiment of the disclosure, the second sensor may be implemented using the first radar system 500, wherein the second sensor has, for example, a radar system sensing range R2.

Figure 4:
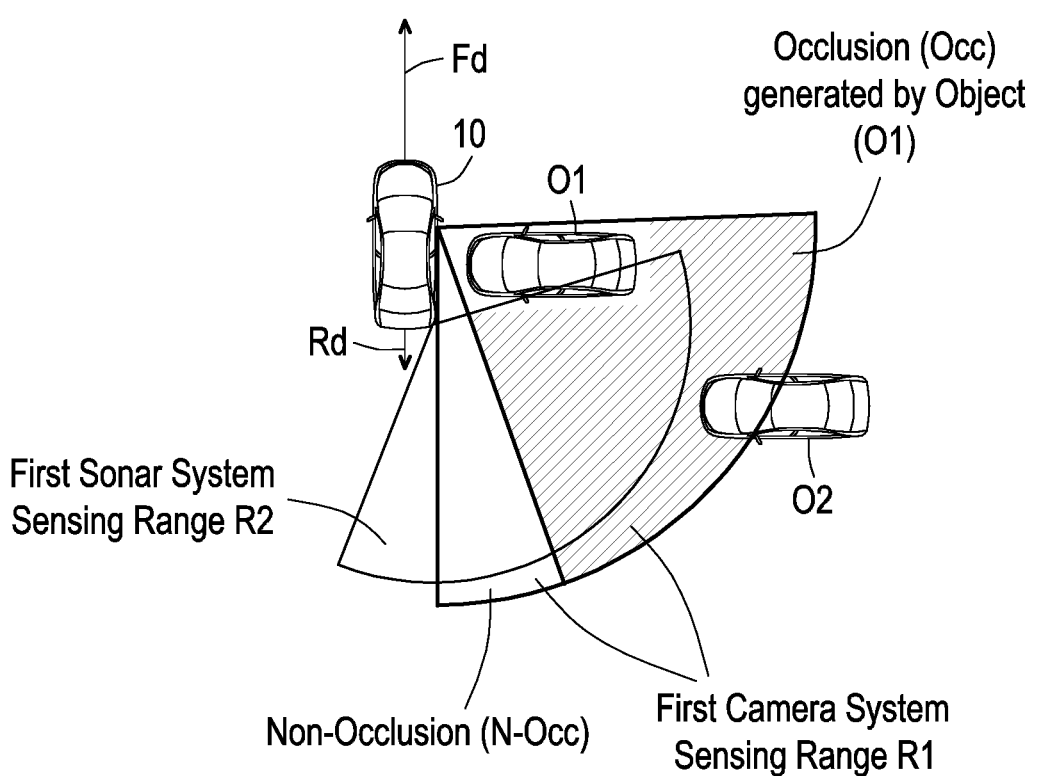
FIG. 4 is a schematic diagram illustrating an occlusion generated by an object according to an embodiment of the disclosure.

FIG. 4 is a schematic diagram illustrating an occlusion generated by an object according to an embodiment of the disclosure. Referring to FIG. 4, a first object O1 is located inside the first camera system sensing range R1 and is detected by the first camera system 300. The first object O1 is located inside the first sonar system sensing range R2 and is detected by the first sonar system 400. The first object O1 generates an occlusion region Occ in the first camera system sensing range R1 of the first camera system 300. That is to say, an occlusion region Occ will be generated in the first camera system sensing range R1 due to a presence of the first object O1 blocking a view of the first camera system 300. The occlusion region Occ is, for example, a blind spot of the first camera system 300. For example, the first camera system 300 may not be able to detect a second object O2 on an other side of the first object O1 even when the second object O2 is located inside the first camera system sensing range R1 due to the occlusion region Occ produced by the first object O1. The control device 100 includes an occlusion detection part, detecting a presence of the occlusion region Occ in the first camera system 300 based on the sensor data received from the first camera system 300. As shown in FIG. 4, the first camera system sensing range R1 may include the occlusion region Occ and a non-occlusion region N-Occ. That is to say, the occlusion region Occ and the non-occlusion region N-Occ make up the first camera system sensing range R1. In the present embodiment, when the occlusion region Occ is detected, the control device 100 supports and/or controls the automated driving of the vehicle 10 to increase the non-occlusion region N-Occ further into the occlusion region Occ so as to reduce the occlusion region Occ. In this way, the first camera system 300 may see further into the occlusion region Occ such that the blind spot behind the first object O1 is reduce/decreased. When the blind spot behind the first object O1 is reduced/decreased, the second object O2 located in the first camera system sensing range R1 may be detected. In other words, the first camera system 300 may see further into the occlusion region Occ such that the occlusion region Occ is reduced and the second object O2 becomes located inside the non-occlusion region N-Occ. The object O2 may be detected by the first camera system 300 once the object 2 becomes located in the non-occlusion region N-Occ.

Figures 5, 6:
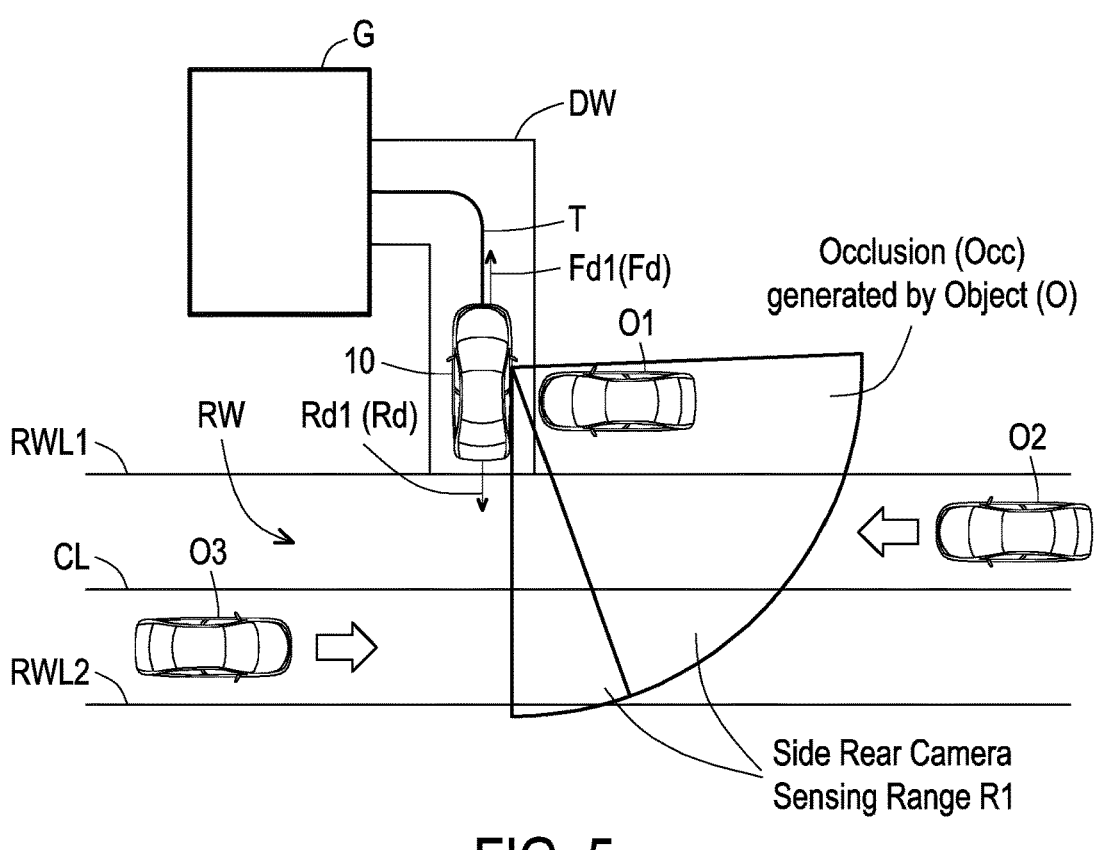
FIG. 5 is a schematic diagram illustrating a vehicle entering a roadway in a first state according to an embodiment of the disclosure.
FIG. 6 is a schematic diagram illustrating a vehicle entering a roadway in a second state according to an embodiment of the disclosure.

FIG. 5 is a schematic diagram illustrating a vehicle entering a roadway in a first state according to an embodiment of the disclosure. Referring to FIG. 5, in the present embodiment, the vehicle 10 is in the automated driving mode, wherein the control device 100 transmits control signals to the automated driving system 200 to perform automated driving of the vehicle 10. The control device 100 includes a target trajectory generating part, generating a predetermined target trajectory T of the vehicle 10 for automated driving of the vehicle 10. The predetermined target trajectory T is set such that the vehicle 10 is to reverse out of a garage G, and the vehicle 10 is configured to enter a roadway RW from an outside of the roadway RW via a rear direction Rd1 of the vehicle 10. In other words, the vehicle 10 is configured to reverse into the roadway RW. The roadway RW is defined by, for example, a first road way line RWL1, a second road way line RWL2, and a center line CL disposed between the first road way line RWL1 and the second road way line RWL2. In the present embodiment, the road way RW is a two way street having one lane going in each direction. However, the disclosure is not limited thereto, and the road way RW may be set according to requirements. The vehicle 10 may determine details about the roadway RW, for example whether the road way RW is a one-way street or a two-way street and how many lanes are included in the road way RW by detecting details of the roadway RW using the plurality of sensors prior to the vehicle 10 turning into the drive way DW. In another embodiment, the details about the roadway RW may be pre-stored in the memory of the control device based on map data such as a map.

Referring to FIG. 5, the vehicle 10 approaches the roadway RW in the "first state". The first state may be, for example, a state in which the rear direction Rd (Rd1) of the vehicle 10 is substantially orthogonal to the road way RW. More specifically, the "first state" is a state in which the rear direction Rd (Rd1) of the vehicle 10 is substantially orthogonal to the first road way line RWL1 of the road way RW when the vehicle 10 enters the roadway RW from the outside of the roadway RW. The outside of the roadway RW may be, for example, a drive way DW that leads to the garage G of a house. The first object O1 is a vehicle parked on a side of the roadway. The second object O2 is a vehicle travelling in a first direction of the roadway RW, and the third object O3 is a vehicle travelling in a second direction of the roadway RW opposite to the first direction.

FIG. 6 is a schematic diagram illustrating a vehicle entering a roadway in a second state according to an embodiment of the disclosure. Referring to FIG. 6, the "second state" is a state in which a rear direction Rd (Rd2) of the vehicle 10 is not substantially orthogonal to the road way RW. More specifically, the "second state" is a state in which the rear direction Rd (Rd2) of the vehicle 10 is not substantially orthogonal to the first road way line RWL1 of the road way RW.

Referring to FIG. 5 and FIG. 6, a difference in a pointing direction between the rear direction Rd (Rd1) of the first state (in FIG. 5) and the rear direction Rd (Rd2) of the second state (in FIG. 6) is represented by an angle shown in FIG. 6. Referring to FIG. 5 and FIG. 6, the predetermined target trajectory T may be generated such that, when the vehicle 10 enters the roadway RW, the rear direction Rd of the vehicle 10 relative to the roadway RW may be set to be in the first state (Rd1) of FIG. 5, or in the second state (Rd2) of FIG. 6. More specifically, in a case when the control device 100 detects the presence of the occlusion region Occ, the predetermined target trajectory T is generated such that, when the vehicle 10 enters the roadway RW, the rear direction (Rd) of the vehicle 10 relative to the roadway RW is set such that the occlusion region Occ is reduced.

Figure 7:
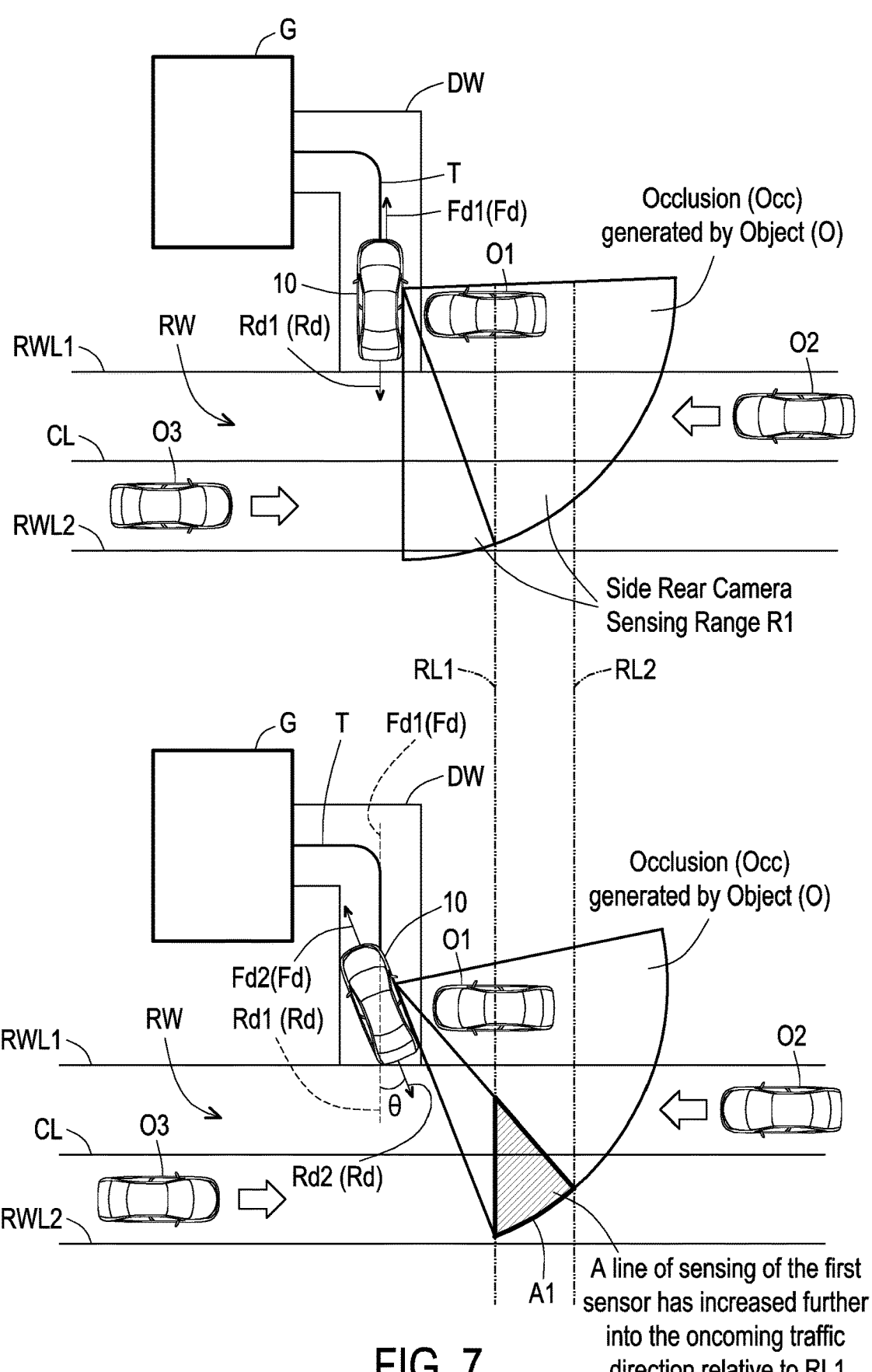
FIG. 7 is a schematic diagram illustrating an example of how an occlusion is reduced by entering the roadway in the second state compared to entering the roadway in the first state according to an embodiment of the disclosure.

FIG. 7 is a schematic diagram illustrating an example of how an occlusion is reduced by entering the roadway in the second state compared to entering the roadway in the first state according to an embodiment of the disclosure. Referring to FIG. 7, an area A1 represents an area where the occlusion region Occ is reduced by entering the roadway RW in the second state (Rd2) of FIG. 6 compared to entering the roadway RW in the first state (Rd1) of FIG. 5. In more detail, in a case when a side of the vehicle 10 at which the occlusion region Occ is detected and a side of the vehicle 10 from which an oncoming traffic is approaching the vehicle 10 are the same side, the predetermined target trajectory T sets the rear direction Rd2 of the vehicle 10 relative to the roadway RW to be rotated toward an oncoming traffic direction. In FIG. 7, a side of the vehicle 10 at which the occlusion region Occ is detected is the right side of the vehicle 10. In FIG. 7, a side of the vehicle 10 from which an oncoming traffic is approaching the vehicle 10 is the right side of the vehicle 10. Since the side of the vehicle 10 at which the occlusion region Occ is detected and the side of the vehicle 10 from which the oncoming traffic is approaching the vehicle 10 are the same side, namely the right side of the vehicle 10, therefore the predetermined target trajectory T sets the rear direction Rd (Rd2) of the vehicle 10 relative to the roadway RW to be rotated toward an oncoming traffic direction, namely rotated towards the right side or counter-clockwise. That is to say, the predetermined target trajectory T sets the rear direction Rd (Rd2) of the vehicle relative to the roadway RW to be rotated counter-clockwise toward the oncoming traffic to reduce the occlusion region Occ in an oncoming traffic direction. More specifically, the side of the vehicle 10 from which the oncoming traffic is approaching the vehicle 10 is the oncoming traffic O2 approaching the vehicle 10 from a lane of the roadway RW closest to the vehicle, and is not the oncoming traffic O3 approaching the vehicle 10 from a lane of the roadway RW away from the vehicle 10.

Referring to FIG. 7, in a case when the side of the vehicle 10 at which the occlusion region Occ is detected and the side of the vehicle 10 from which an oncoming traffic O2 is approaching the vehicle 10 are the same, then the occlusion region Occ may be reduced by rotating the rear direction Rd2 of the vehicle 10 relative to the roadway towards the oncoming traffic O2 so as to increase a line of sensing of the first camera system 300 further into the oncoming traffic direction (for example, further towards the object O2). As shown in FIG. 7, the line of sensing RL1 of the first camera system 300 has moved further into the oncoming traffic direction (for example, further towards the object O2) towards the line of sensing RL2. More specifically, since the line of sensing of the first sensor (first camera system 300) has increased further into the oncoming traffic direction, for example, from a first reference line RL1 to a second reference line RL2, therefore the occlusion region Occ in the oncoming traffic direction is reduced. The area A1 in FIG. 7 shows an example area of the occlusion region Occ that is reduced. In other words, the non-occlusion region N-Occ is increase further into the occlusion region Occ in at least the area A1 so as to reduce the occlusion region Occ. In this way, the object O2 may be detected by the first camera system 300 once the object 2 enters the area 1 in FIG. 7 even without the object 2 entering the non-occlusion region N-Occ shown in FIG. 5. When the line of sensing moves from the first reference line RL1 to the second reference line RL2, an azimuth angle of the non-occlusion region N-Occ is increased towards the occlusion Occ.

Figure 8:
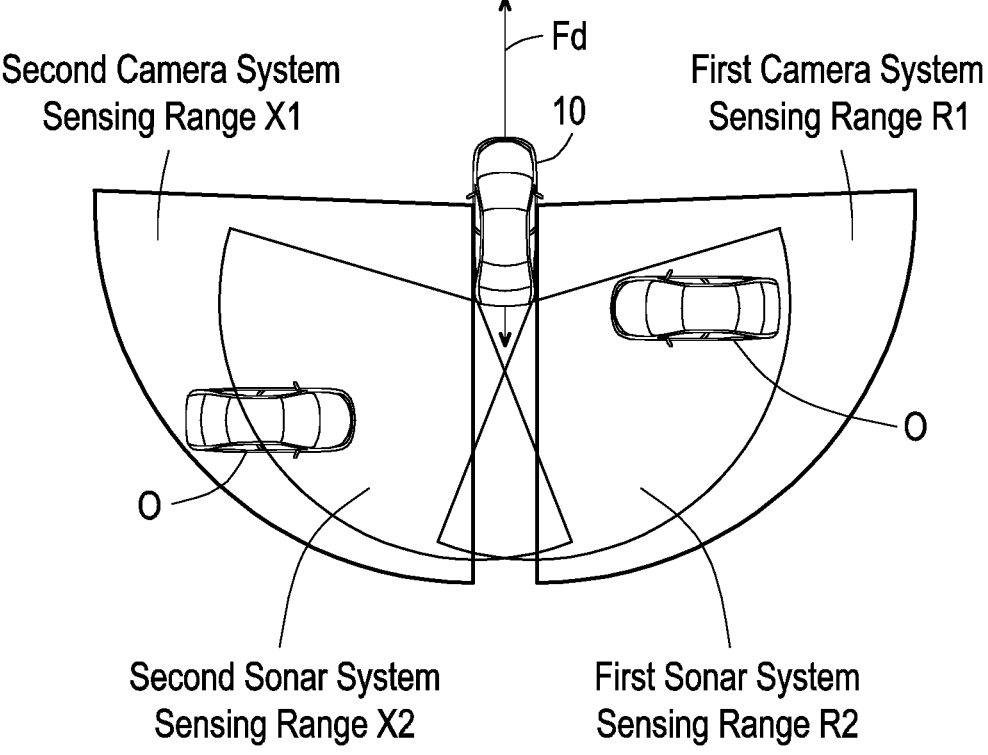
FIG. 8 is a schematic diagram illustrating a vehicle including a first sensor, a second sensor, a third sensor and a fourth sensor for detecting an object around the vehicle according to an embodiment of the disclosure.

FIG. 8 is a schematic diagram illustrating a vehicle including a first sensor, a second sensor, a third sensor and a fourth sensor for detecting an object around the vehicle according to an embodiment of the disclosure. Referring to FIG. 8, the second camera system 310 and the second sonar system 410 may be disposed on the vehicle 10 and sensing a left side of the vehicle 10. The second camera system 310 is an example of a third sensor. The second sonar system 410 is an example of a fourth sensor. In this way the oncoming traffic on the left side, the right side of the vehicle 10 may be detected by the first sensor (first camera system 300), the second sensor (first sonar system 400), the third sensor (second camera system 310) and the fourth sensor (second sonar system 410). The second camera system 310 disposed at the left side mirror of the vehicle 10 has a second camera system sensing range X1. The second camera system sensing range X1 is an example of a third detection area of a third sensor. In addition, the second sonar system 410 disposed at the rear of the vehicle 10 has a second sonar system sensing range X2. The second sonar system sensing range X2 is an example of a fourth detection area of a fourth sensor. The second camera system sensing range X1 of the second camera system 310 is different from the second sonar system sensing range X2 of the second sonar system 400. The second camera system 310 and/or the second sonar system 410 may detect an object O. In the present embodiment, the object O is another vehicle. However, the disclosure is not limited thereto. In another embodiment of the disclosure, the object O may be, for example, a wall, a power pole, and/or the like.

Referring to FIG. 8, the second camera system sensing range X1 and the second sonar system sensing range X2 are illustrated as examples only and the disclosure is not limited thereto. As shown in FIG. 8, the third detection area X1 of the third sensor 310 is different from the fourth detection area X2 of the fourth sensor 410. Furthermore, in the embodiment of FIG. 8, the fourth sensor 410 is implemented using the second sonar system 410, however in another embodiment of the disclosure, the fourth sensor may be implemented using the second radar system 510, wherein the fourth sensor has, for example, a radar system sensing range X2.

Referring to FIG. 8, when a side of the vehicle 10 at which the occlusion region Occ is detected is the left side of the vehicle 10, and a side of the vehicle 10 from which an oncoming traffic is approaching the vehicle 10 is the left side of the vehicle 10, then the side of the vehicle 10 at which the occlusion region Occ is detected and the side of the vehicle 10 from which the oncoming traffic is approaching the vehicle 10 are the same left side, therefore the predetermined target trajectory T sets the rear direction Rd of the vehicle 10 relative to the roadway RW to be rotated toward an oncoming traffic direction, namely the left side or clockwise.

Referring to FIG. 8, the second camera system 310 and the second sonar system 410 may detect objects O in the second camera system sensing range X1 and the second sonar system sensing range X2 in a similar manner as to how the first camera system 300 and the first sonar system 400 detect objects in the first camera system sensing range R1 and the first sonar system sensing range R2 as was described in the embodiments of FIG. 4-FIG. 7 above. Accordingly, details of the second camera system 310 and the second sonar system 410 are omitted here.

FIG. 9 is a schematic diagram illustrating a pattern table when the vehicle merges into a first lane according to an embodiment of the disclosure. FIG. 10 is a schematic diagram illustrating a pattern table when the vehicle merges into a second lane having a travelling direction toward the left according to an embodiment of the disclosure. FIG. 11 is a schematic graph illustrating a pattern table when the vehicle merges into a second lane having a travelling direction toward the right according to an embodiment of the disclosure. Referring to FIG. 9, FIG. 10 and FIG. 11, the "LANE TO MERGE INTO" may be determined by, for example, the predetermined target trajectory T. The predetermined target trajectory T may determine which lane the vehicle 10 should be in by using a current position of the vehicle 10 and a destination position. For example, when the vehicle 10 must make a right turn or a left turn ahead, the predetermined target trajectory T may determine which lane the vehicle should be in.

Referring to FIG. 9, FIG. 10 and FIG. 11, the "ONCOMING TRAFFIC DIRECTION" (the side of the vehicle 10 from which the oncoming traffic is approaching the vehicle 10) may be, for example, pre-stored in the memory of the control device 10. For example, when the vehicle is designed for United States, then the side of the vehicle 10 from which the oncoming traffic is approaching the vehicle 10 may be set to the right side of the vehicle 10 (when the vehicle is in reverse), since the vehicle drive on the right side of the road in United States. In another example, when the vehicle is designed for Japan, then the side of the vehicle 10 from which the oncoming traffic is approaching the vehicle 10 may be set to the left side of the vehicle 10 (when the vehicle is in reverse), since the vehicles drive on the left side of the road in Japan. In another example embodiment, the side of the vehicle 10 from which the oncoming traffic is approaching the vehicle 10 may be determined by the sensors of the vehicle 10. For example, the vehicle 10 may store details about the roadway RW, for example, which side of the road the vehicle 10 is travelling on prior to the vehicle 10 turning into the drive way DW. The above described are examples only, and are not intended to limit the disclosure. In addition, in an embodiment of the disclosure, the road may be a one-way road, and the side of the vehicle 10 from which the oncoming traffic is approaching the vehicle 10 may be, for example, pre-stored in the memory of the control device 10, or determined by the sensors of the vehicle 10. In another embodiment of the disclosure, the road may be a one lane road having traffic going in both directions and the side of the vehicle 10 from which the oncoming traffic is approaching the vehicle 10 may be, for example, pre-stored in the memory of the control device 10, or determined by the sensors of the vehicle 10.

Referring to FIG. 9, FIG. 10 and FIG. 11, the "POSITION OF PARKED CAR" may be determined by, for example, any of the first camera system 300, the second camera system 310, the first sonar system 400, the second sonar system 410, the first radar system 500 and the second radar system 510.

Referring to FIG. 9, FIG. 10 and FIG. 11, the "DIRECTION TO CHECK" may be, for example, the same as "ONCOMING TRAFFIC DIRECTION" (the side of the vehicle 10 from which the oncoming traffic is approaching the vehicle 10). That is to say, the "DIRECTION TO CHECK" corresponds to the "ONCOMING TRAFFIC DIRECTION".

Referring to FIG. 9, FIG. 10 and FIG. 11, the "PRESENCE OF OCCLUSION" (namely, PRESENCE OF OCCLUSION in the ONCOMING TRAFFIC DIRECTION) may be determined by, for example, the control device 100 receiving sensor data from any of the first camera system 300, the second camera system 310, the first sonar system 400, the second sonar system 410, the first radar system 500 and the second radar system 510 to determine any occlusions on any side of the vehicle 10. Next, a side of the vehicle 10 at which the occlusion region Occ is detected and a side of the vehicle 10 from which an oncoming traffic (for example, object O2) is approaching the vehicle 10 is compared. When the side of the vehicle 10 at which the occlusion region Occ is detected and the side of the vehicle 10 from which the oncoming traffic O2 is approaching the vehicle 10 are the same, then control device 100 determines the "PRESENCE OF OCCLUSION"(namely, PRESENCE OF OCCLUSION in the ONCOMING TRAFFIC DIRECTION) to be "YES". On the other hand, when the side of the vehicle 10 at which the occlusion region Occ is detected and the side of the vehicle 10 from which the oncoming traffic O2 is approaching the vehicle 10 are not the same, then the control device 100 determines the "PRESENCE OF OCCLUSION" (namely, PRESENCE OF OCCLUSION in the "ONCOMING TRAFFIC DIRECTION) to be "NO".

Referring to FIG. 9, FIG. 10 and FIG. 11, when the "PRESENCE OF OCCLUSION" (namely, PRESENCE OF OCCLUSION in the ONCOMING TRAFFIC DIRECTION) is "NO", then the predetermined target trajectory sets the rear direction Rd of the vehicle to be orthogonal to the roadway RW. More specifically, in a case when the side of the vehicle 10 at which the occlusion region Occ is detected and the side of the vehicle 10 from which the oncoming traffic is approaching the vehicle 10 are not the same, then the predetermined target trajectory sets the rear direction Rd of the vehicle 10 to be orthogonal to the roadway RW.

Referring to FIG. 9, FIG. 10 and FIG. 11, the "DIRECTION TO ROTATE CAR" may be, for example, determined based on the "PRESENCE OF OCCLUSION" and the "ONCOMING TRAFFIC DIRECTION". For example, when "PRESENCE OF OCCLUSION" is "YES", then the rear direction Rd of the vehicle 10 is rotated toward the oncoming traffic, namely counter-clockwise or clockwise based on the oncoming traffic direction.

In an embodiment of the disclosure, the second sensor, for example, the sonar systems 400, 410 and the radar systems 500, 510 may be used to confirm a presence of the object O that is detected by the camera systems 300, 310. In an embodiment of the disclosure, the second sensor may be, for example, a Laser Imaging Detection and Ranging (LIDAR). In an embodiment of the disclosure, when the sensing range of the first sensor 300, 310 is limited by the occlusion Occ, the radar system 500, 510 may be used to detect objects in distant non-limited areas. More specifically, in an embodiment of the disclosure, the sensing range of the radar system is greater than the sensing range of the sonar system.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control device adapted to generate a predetermined target trajectory of a vehicle for automated driving of the vehicle, wherein the vehicle includes a first sensor and a second sensor adapted to detect an object around the vehicle, and a first detection area of the first sensor is different from a second detection area of the second sensor, the control device comprising:

a processor configured to function as:

a data receiving part, receiving sensor data from the first sensor;

an occlusion detection part, detecting a presence of an occlusion around the vehicle based on the sensor data received;

a target trajectory generating part, generating the predetermined target trajectory of the vehicle for automated driving of the vehicle, the predetermined target trajectory is set such that the vehicle is configured to enter a roadway from an outside of the roadway via a rear direction of the vehicle;

wherein in a case when the occlusion detection part detects the presence of the occlusion, the predetermined target trajectory is generated such that, when the vehicle enters the roadway from the outside of the roadway via the rear direction of the vehicle, the rear direction of the vehicle relative to the roadway is set such that the occlusion is reduced, wherein in a case when a side of the vehicle at which the occlusion is detected and a side of the vehicle from which an oncoming traffic is approaching the vehicle are the same, the predetermined target trajectory sets the rear direction of the vehicle relative to the roadway to be rotated toward the oncoming traffic when the vehicle enters the roadway from the outside of the roadway via the rear direction of the vehicle, wherein the oncoming traffic is oncoming traffic approaching the vehicle from a lane of the roadway closest to the vehicle when the vehicle is located outside of the roadway.

2. The control device according to claim 1, wherein the first sensor is an image sensor disposed at a side of the vehicle, and the second sensor is a radar disposed at a rear side of the vehicle.

3. The control device according to claim 1, wherein the first sensor is an image sensor disposed at a side of the vehicle, and the second sensor is a LIDAR disposed at a rear side of the vehicle.

4. The control device according to claim 1, wherein in a case when the side of the vehicle at which the occlusion is detected and the side of the vehicle from which an oncoming traffic is approaching the vehicle are not the same, the predetermined target trajectory sets the rear direction of the vehicle to be orthogonal to the roadway.

5. The control device according to claim 1, wherein the predetermined target trajectory sets the rear direction of the vehicle relative to the roadway to be rotated clockwise toward the oncoming traffic to reduce the occlusion in an oncoming traffic direction.

6. The control device according to claim 1, wherein the predetermined target trajectory sets the rear direction of the vehicle relative to the roadway to be rotated counter-clockwise toward the oncoming traffic to reduce the occlusion in an oncoming traffic direction.

7. The control device according to claim 1, wherein in a case when a side of the vehicle at which the occlusion is detected and a side of the vehicle from which an oncoming traffic is approaching the vehicle are the same, the occlusion is reduced by rotating the rear direction of the vehicle relative to the roadway so as to increase a line of sensing of the first sensor further into an oncoming traffic direction.

8. A vehicle, comprising:

the control device according to claim 1.

9. The control device according to claim 1, wherein the outside of the roadway is a drive way that leads to a garage of a house.

\* \* \* \* \*